(12) United States Patent
 Phirmis

(10) Patent No.: US 10,200,136 B2
(45) Date of Patent: Feb. 5, 2019

(54) METHOD FOR BROADCASTING PROTECTED MULTIMEDIA CONTENTS

(71) Applicant: VIACCESS, Paris la Défense (FR)

(72) Inventor: Mathieu Phirmis, Antony (FR)

(73) Assignee: VIACCESS, Paris la Défense (FR)

( * ) Notice: Subject to any disclaimer, the term of this patent is extended or adjusted under 35 U.S.C. 154(b) by 0 days.

(21) Appl. No.: 15/543,762

(22) PCT Filed: Jan. 8, 2016

(86) PCT No.: PCT/FR2016/050032
§ 371 (c)(1),
(2) Date: Jul. 14, 2017

(87) PCT Pub. No.: WO2016/116681
PCT Pub. Date: Jul. 28, 2016

(65) Prior Publication Data
US 2017/0373778 A1   Dec. 28, 2017

(30) Foreign Application Priority Data

Jan. 20, 2015 (FR) ...................................... 15 50453

(51) Int. Cl.
| | |
|---|---|
| *H04H 60/15* | (2008.01) |
| *G06F 21/10* | (2013.01) |
| *H04H 60/23* | (2008.01) |
| *H04N 21/239* | (2011.01) |
| *H04N 21/266* | (2011.01) |
| *H04N 21/4623* | (2011.01) |

(52) U.S. Cl.
CPC ............ *H04H 60/15* (2013.01); *G06F 21/10* (2013.01); *H04H 60/23* (2013.01); *H04N 21/239* (2013.01); *H04N 21/2393* (2013.01); *H04N 21/26606* (2013.01); *H04N 21/4623* (2013.01)

(58) Field of Classification Search
None
See application file for complete search history.

(56) References Cited

U.S. PATENT DOCUMENTS

2010/0131973 A1   5/2010   Dillon et al.

FOREIGN PATENT DOCUMENTS

| | | | |
|---|---|---|---|
| EP | 2317767 | 5/2011 | |
| EP | 2317767 A1 * | 5/2011 | ............ G06F 21/10 |
| FR | 2835371 | 8/2003 | |
| WO | WO 2005/091635 | 9/2005 | |

(Continued)

*Primary Examiner* — Hoang Vu A Nguyen Ba
(74) *Attorney, Agent, or Firm* — Occhiuti & Rohlicek LLP

(57) ABSTRACT

A method for broadcasting protected multimedia content includes, at predetermined intervals, having an access-rights server broadcast each new right of access to the broadcast multimedia content only to those terminals whose logins are included in a broadcast list. In response to a predetermined event, a terminal sends, to the access-rights server, via a point-to-point connection, a status message indicating, to the access-rights server, that the terminal is in its ready state. Alternatively, if the terminal is occupied, it avoids sending a status message. In the absence of reception of the status message that was expected in response to the predetermined event, the access-rights server automatically removes the identifier of the terminal from the broadcast list.

12 Claims, 2 Drawing Sheets

(56) References Cited

FOREIGN PATENT DOCUMENTS

| WO | WO-2005091635 A2 * | 9/2005 | ........... H04N 7/1675 |
| WO | WO 2009/094502 | 7/2009 | |
| WO | WO-2009094502 A1 * | 7/2009 | ........... H04N 7/1675 |

* cited by examiner

METHOD FOR BROADCASTING PROTECTED MULTIMEDIA CONTENTS

CROSS REFERENCE TO RELATED APPLICATIONS

This application is a National Stage of International Application No. PCT/FR2016/050032 filed on Jan. 8, 2016 which claims priority to French Application No. 1550453 filed on Jan. 20, 2015 the contents of which are hereby incorporated by reference in their entirety.

FIELD OF INVENTION

The invention concerns broadcasting, to terminals that are mechanically independent of each other and connected to an same access-rights server by way of a long-distance information transmission network, multimedia content that has been protected by access rights.

BACKGROUND

It is known to transmit protected multimedia content to terminals that are connected to the same access-rights server using a long-distance information transmission network. In these known methods the terminal sends, to the access-rights server, an access-rights request to receive the access rights authorizing it to access the multimedia content. Then, in response to the access-rights request, the access-rights server adds the terminal's identifier to a broadcast list. The access-rights server then broadcasts, at predetermined intervals, each new access right to the multimedia content only to those terminals whose identifier appears in the broadcast list and without waiting for these terminals to have requested this new access right by sending a new access rights request.

In response to having received each access right, the terminal accesses the multimedia content that has been transmitted. In the absence of having received the access right, the terminal prevents access to the multimedia content that has been transmitted.

At any given time, the terminal switches, independently of the other terminals from a ready state to an occupied state. During the ready state, the terminal is able to send, by means of a point-to-point connection, the access rights request and to receive the requested access right. During the occupied state, the terminal is unable to do either.

In the case of the protected multimedia content by a conditional-access system ("CAS"), an entitlement-management message EMM contains an access right $DA_i$. This access right $DA_i$ typically contains a cryptogram $K_S*(K_i)$ of an operating key $K_S$ that was encrypted with a private key $K_i$ of a terminal $T_i$. This access right $DA_i$ is specific to the terminal $T_i$ since only this terminal $T_i$ has the private key K and is thus able to decrypt the cryptogram $K_S*(K_i)$ in order to obtain the key $K_S$ allowing it to access the protected multimedia content. In particular, even if other terminals receive the access right $DA_i$, those other terminals cannot use it. This is because those other terminals lack the private key $K_i$.

The foregoing method strengthens the security of the method for transmitting protected multimedia content. On the other hand, the access-rights server needs to prepare and send as many specific access rights $DA_i$ as there are different terminals wishing to access this protected multimedia content. Given that the number of terminals may be very large, such as more than 10,000 or 1,000,000, this consumes a sizeable amount of bandwidth in the transmission network.

To ameliorate this difficulty, it is known to distribute the terminals into several groups and to assign, to each group, a specific time slot. The access-rights server then transmits the access rights $DA_i$ for a group of terminals only during the time slot associated with that group. This reduces the bandwidth needed to send the access rights $DA_i$ to the terminals.

A difficulty with the foregoing solution is the need to form and manage groups of terminals.

SUMMARY

In the context of hybrid networks, the invention provides a method for reducing bandwidth used by the transmission of access rights $DA_i$ to the terminals in a way that avoids the need to form and manage groups of terminals.

The above method includes automatically halting the transmission of access rights to the terminals that are in their occupied state. This reduces the number of access rights $DA_i$ transmitted and thus limits the bandwidth used for this transmission. In this method, the decrease in the bandwidth needed to transmit the access rights is obtained without it being necessary to assemble the terminals into groups, such as is described in application WO2009094502A1.

The various practices of this method of broadcasting furthermore offer the following advantages:

Using occupied profiles of the terminals to automatically add a terminal to the broadcast list even before that terminal sends, to the access-rights server, an access-right request improves quality-of-service. In fact, when a terminal switches from its occupied state to its ready state during a time slot when it is customarily in its ready state with a probability greater than a predetermined threshold, the terminal directly receives the access rights needed to access the protected multimedia content even without the need to request them from the access-rights server. This reduces latency by avoiding the need to wait to those access rights in response to its request.

Using the status messages to update the value of the probability indicator associated with each time slot of the occupation profile of a terminal enables automatically updating the occupation profile and thus results in permanent adaptation to the use of the terminal.

Automatically removing the identifier of a terminal from the broadcast list only after having failed to receive several consecutive expected status messages increases the robustness of the broadcasting method by avoiding or reducing the risk of the access-rights server's accidental failure to receive the status message. This prevents the systematic removal of the terminal's identifier from the broadcast list whenever the access-rights server does not receive a status message. As an example, an accidental failure to receive the status message may be caused by a temporary inability to establish a point-to-point connection between the terminal and the network head end Using access rights specific to each terminal also improves the broadcasting method's security. This is because, even if another terminal receives or intercepts access rights, that other terminal still cannot use those access rights.

Using the message acknowledging reception of the access rights as a status message enables the same message to be used to acknowledge receipt of the access right and also to indicate, to the access server, that the terminal is in its ready state. Moreover, it is thus possible to carry out the method claimed without having to modify the existing terminals.

Halting the cyclical broadcasting of the same access right as soon as the access-right server has received a receipt acknowledgement for this access right makes it possible to further reduce the bandwidth needed for the transmission of the access rights.

Automatically and systematically removing, from the broadcast list, the identifier of a terminal for which the difference between a current date and the last recorded date on which a status message was received for this terminal has crossed a predetermined threshold makes it possible to further reduce the bandwidth needed for transmission of the access rights.

The invention likewise concerns an information-recording medium containing instructions to carry out the above method for broadcasting protected multimedia content when en electronic computer executes these instructions.

As used herein, accessing protected multimedia content means: loading, into memory, consecutive fragments of the multimedia content, removing the protection on the fly, as that content is received, decoding it, and transmitting it to a multimedia apparatus to be played, to be recorded, or to be used in any authorized way.

As used herein, to "remove the protection on the fly" means processing fragments of the multimedia content as they are received without having to wait for the all fragments of the multimedia content to be fully received.

As used herein, "multimedia content" refers to audio-visual content, such as television programs, audio content alone, such as a radio program, or, more generally, to any digital content containing video and/or audio, such as a computer application, a game, a slide show, an image, or any data set.

As used herein, "multimedia time content" refers to multimedia content that has a temporal succession of sounds, in the case of an audio time content, or images, in the case of a video time content, or synchronized sounds and images, in the case of audiovisual multimedia time content. "Multimedia time content" also includes interactive time components synchronized in time with sounds or images.

The protected multimedia content transmitted is broadcast continually after having been protected, for example, by a conditional-access system. The terminology of the field of conditional-access systems shall be used herein.

As used herein, a point-to-point connection is a "unicast" connection.

As used herein, the term "point-to-multipoint connection" means a connection chosen from the group composed of a "broadcast" connection and a "multicast" connection. The terms "broadcast" and "multicast" are thus to be considered substantially equivalent. The point-to-point connection is a two-way connection. The point-to-multipoint connection is a one-way connection from the transmitter to the receivers.

By a "hybrid network" it is meant a network in which: network a head end broadcasts, with the aid of a point-to-multipoint connection, to a set of terminals, the access rights needed for access to the multimedia content, and furthermore it is possible, especially on the initiative of the terminals, to establish a point-to-point connection between each terminal and the network head end.

The terms "scrambling" and "descrambling" are used for the protected multimedia content by a conditional-access system as being synonymous with the terms encryption and decryption that remain used for other data, such as the control words and keys.

Access rights authorize a terminal to access protected multimedia content. Typically, access rights contain at least one decryption key for enabling the descrambling of the protected multimedia content or the data needed for the descrambling of the protected multimedia content. Access rights may furthermore contain other rights acquired by the terminal. If the terminal does not possess the necessary access rights, it prevents access to the multimedia content. This can be done by not descrambling the multimedia content, or descrambling it improperly. On the other hand, if the terminal possesses the necessary access rights, it descrambles the multimedia content to obtain descrambled multimedia content. Such multimedia content is said to be "in clear."

As used herein, multimedia content that is "in clear" means that the multimedia content no longer needs to be decrypted in order to be played by a multimedia apparatus in a way that is directly perceivable and intelligible to a human being.

As used herein, "multimedia apparatus" refers to any device that is able to play the multimedia content in clear, such as a television set or a multimedia reader.

The invention likewise concerns an access-rights server to carry out the method claimed.

BRIEF DESCRIPTION OF THE DRAWINGS

The invention will be better comprehended upon perusal of the following description, given only as a non-limiting example, and making reference to the drawings in which.

In these figures, the same references are used to denote the same elements. In the remainder of this description, the features that are well known to the skilled person will not be described in detail.

DETAILED DESCRIPTION

Figure 1:
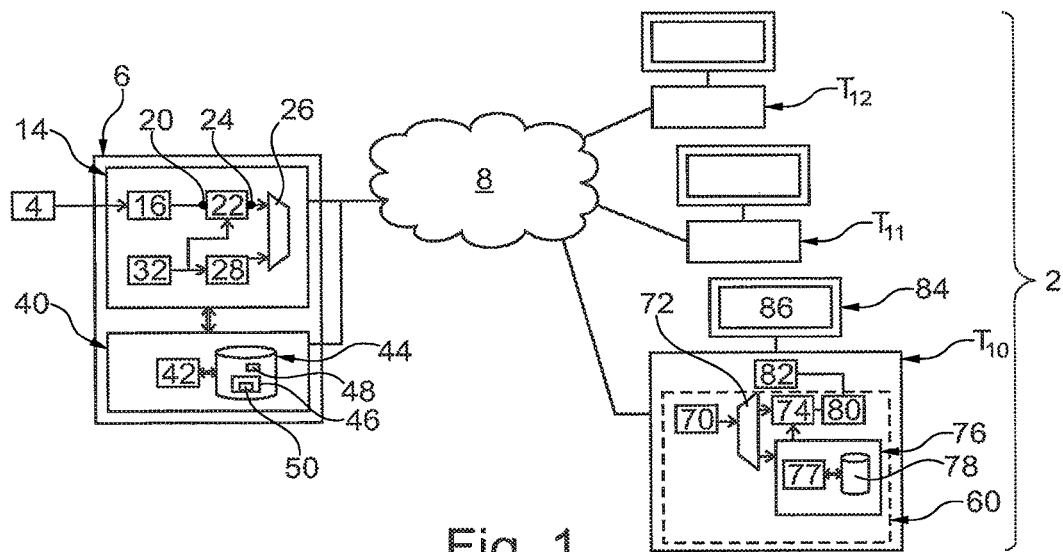
FIG. 1 is a schematic representation of a system for broadcasting protected multimedia content.

FIG. 1 represents a broadcast system 2 for broadcasting protected multimedia content. The broadcast system 2 broadcasts multimedia content that unfolds over time. An example of such multimedia content is an audiovisual program such as a television show or a film.

One or more sources 4 generate the unencrypted multimedia content and transmit it to a network's head end 6. The head end 6 broadcasts the multimedia content simultaneously to receiving terminals through an information transmission network 8.

Typically, the number of terminals is greater than 1,000 or 10,000. To simplify FIG. 1, only three terminals T10, T11 and T12 have been shown. In the remainder of this description, each terminal of the broadcast system 2 is identified by a reference Ti, where the index "i" uniquely identifies the terminal Ti of the broadcast system 2 among the set of terminals of this system.

The network 8 is a long-distance information transmission network through which the head end 6 establishes a point-to-multipoint connection between itself and any group of terminals of the broadcast system 2. Within this network 8, it is possible to establish a point-to-point connection between any one of the terminals of the broadcast system 2 and the head end 6. In one example, the network 8 is the Internet, also known as the "World Wide Web."

The head end 6 comprises a device 14 for broadcasting protected multimedia content to the terminals via the network 8. This device 14 comprises an encoder 16 that processes digital multimedia content that it receives. In a typical embodiment, the encoder 16 compresses the multimedia content. In one example, the encoder 16 operates in accordance with the standard MPEG2 (Moving Picture Expert Group-2) or the standard UIT-T H264.

The compressed multimedia content is sent to an input 20 of a scrambler 22. The scrambler 22 protects the multimedia content. To do so, the scrambler 22 scrambles each item of compressed multimedia content to make its viewing contingent upon certain conditions of access by users of receiving terminals. Examples of such conditions include purchase of an access ticket. The scrambled multimedia content is restored at an output 24 connected to the input of a multiplexer 26.

The scrambler 22 scrambles each item of compressed multimedia content with the aid of a control word CWt. The index "t" is a serial number to identify the cryptoperiod CPt of the multimedia content scrambled with the control word CWt.

A key generator 32 furnishes the control word CWt to both the scrambler 32 and to a conditional-access system 28. Typically, scrambling conforms to a standard such as the standard DVB-CSA (Digital Video Broadcasting-Common Scrambling Algorithm), ISMA Cryp (Internet Streaming Media Alliance Cryp), SRTP (Secure Real-Time Transport Protocol), AES (Advanced Encryption Standard), etc.

A cryptoperiod of content denotes a sequence of content whose play length has a predetermined duration. This predetermined duration is the "cryptoperiod" of the system. In general, the duration varies among different sequences of content. However, in many cases, it is between five seconds and one minute. A common value for the cryptoperiod is ten seconds. In the embodiment described herein, all the cryptoperiods CPt have the same duration.

The conditional-access system 28 generates entitlement-control messages $ECM_t$ containing at least one cryptogram $CW_t^*$ of the control word $CW_t$ that is generated by the key generator 32 and used by the scrambler 22 to scramble the cryptoperiod $CP_t$. This cryptogram $CW_t^*$ is obtained by encrypting the control word $CW_t$ with an operating key $K_s$. It is typically constructed by the conditional-access system 28.

The conditional-access system 28 also inserts, in each entitlement-control message $ECM_t$, conditions of access CA designed to be compared to access rights acquired by the user to either deny or authorize access to the protected multimedia content. The multiplexer 26 multiplexes the entitlement-control message $ECM_t$ and the scrambled multimedia content before they are transmitted on the network 8.

The conditional-access system 28 uses the same operating key $K_s$ for all the terminals. However, it modifies the operating key $K_s$ after a predetermined period of use. The predetermined period is greater than two cryptoperiods. In typical cases, the predetermined period is at least ten, a hundred, a thousand, or ten thousand successive cryptoperiods $CP_t$. In some examples, this predetermined period is greater than five minutes, thirty minutes, or one hour. However, the predetermined period is generally less than thirty-six hours or twenty-four hours.

In the illustrated embodiment, the scrambling and the multiplexing of the multimedia content conforms to the protocol DVB-CSA (ETSI TS 103 197).

The head end 6 likewise comprises an access-rights server 40 that is connected directly to the network 8. The access-rights server 40 prepares and broadcasts the access rights DAi required for each of the terminals Ti to access the protected multimedia content.

In the embodiment described herein, the server 40 transmits the prepared access rights DAi to the conditional-access system 28. The conditional-access system 28 then incorporates the prepared access rights DAi into an entitlement-management message EMM, which is then transmitted to the multiplexer 26.

To carry out the foregoing procedure, the access-rights server 40 comprises a programmable electronic computer 42 that is able to execute instructions that have been recorded on an information-recording medium. In the illustrated embodiment, the access-rights server 40 comprises a memory 44 containing the necessary instructions to execute the method shown in FIG. 4.

In the embodiment described herein, the memory 44 comprises a first table 46 and a second table 48.

The first table 46 has information needed for the management of the broadcasting of the access rights to each of the terminals. In the illustrated embodiment, the first table 46 has a broadcast list 50. This broadcast list 50 contains the identifier of each terminal to which the access rights should be broadcast.

The second table 48 has occupation profiles for each terminal Ti.

To simplify matters, the terminals T10 to T12 are assumed to be identical. Accordingly, only the terminal T10 is described in further detail.

The network head end 6 may or may not occupy a single site and, in particular, the device 14 and the access-rights server 40 may or may not be distant. In any case, a point-to-point connection can be established between a terminal and the head end 6 globally considered, that is, at least one of the sites of the head end 6, which point-to-point connection allows a two-way communication between the terminal and the access-rights server 40.

The terminal T10 comprises at least one descrambling line 60. The descrambling line 60 descrambles the multimedia content in order to display it on an apparatus 84 or to record it with the help of a recorder.

The descrambling line 60 comprises a receiver 70 that receives the multimedia content that has been broadcast on the network 8. The receiver 70 connects to the input of a demultiplexer 72. The demultiplexer 72 separates the multimedia content from the entitlement-control messages $ECM_t$ and the entitlement-management messages EMM. It then transmits the former to a descrambler 74 and the latter to a security processor 76.

The descrambler 74 descrambles the cryptoperiod $CP_t$ of the scrambled multimedia content based on the control word $CW_t$ transmitted by the security processor 76.

The multimedia content, now having been descrambled, is transmitted to a decoder 80. The decoder 80 decodes and decompresses the now-descrambled multimedia content. The decoded multimedia content is transmitted to a graphics card 82 and/or a sound card that controls the playing of the multimedia content on a playback apparatus 84 equipped with a screen 86 or a loudspeaker. The playback apparatus 84 plays the decrypted multimedia content on the screen 86

The security processor 76 processes confidential information, such as cryptographic keys. In order to preserve the confidentiality of this information, the security processor 76 is designed to resist attacks carried out by hackers. It is thus more robust to these attacks than the other components of the terminal 10. In some embodiments, the security processor 76 is a chip card.

The security processor 76 is realized with the aid of a programmable electronic computer 77 that is able to execute instructions recorded on an information-recording medium. The security processor 76 comprises a memory 78 containing the instructions necessary for the execution of the method of FIG. 4.

The terminal T10 may switch, in a way independent of the other terminals, between a ready state and an occupied state.

In the ready state, the terminal T10 is ready to perform all operations that are necessary to access the multimedia content. In particular, in the ready state, the terminal T10 is ready to receive the protected multimedia content and the access rights broadcast by the device 14 on a point-to-multipoint connection, to establish a point-to-point connection via the network 8 with the access-rights server 40 to request the receiving of an access right allowing it to access the multimedia content transmitted by the device 20, and to send on a point-to-point connection a receipt acknowledgement to the access-rights server 40 each time it has properly received the access right transmitted by the head end 6.

In the occupied state, the terminal T10 is deprived of at least one of the above capabilities.

For example, in the occupied state, the terminal could be shut off or on standby or even disconnected from the network 8. Thus, in the shut-off or in the standby state the terminal typically consumes considerably less electricity than it would in its ready state. In some cases, it uses ten or a hundred times less electricity than in the ready state. In absolute terms, the terminal's electrical consumption is as low as or lower than one watt.

In the embodiment described herein, the terminal T10 switches from its ready state to its occupied state automatically after a predetermined period during which no interaction with the user has occurred. In other embodiments, the terminal T10 switches to its occupied state in response to the receiving a command from the user or on the initiative of the network 8. Likewise, the terminal T10 generally switches from the occupied state to the ready state in response to the receiving of a turn-on command transmitted by the user or on the initiative of the network 8.

Figure 2:
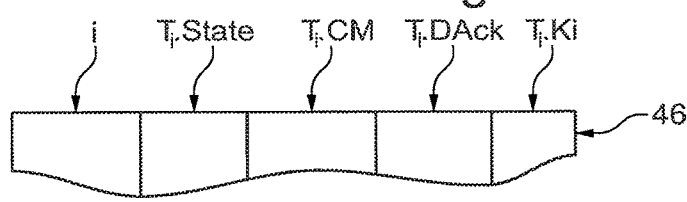
FIGS. 2 and 3 are schematic illustrations of tables used in the system of FIG. 1.

FIG. 2 shows, in greater detail, an exemplary embodiment of the first table 46. In this example, the first table 46 contains one row per terminal of the broadcast system 2.

Figure 3:
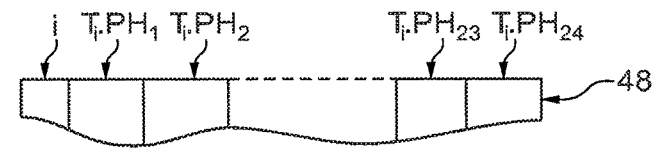

In FIGS. 2 and 3, the undulating edges indicate that only a portion of the first and second tables 46 and 48 have been shown. In these figures, each column contains a particular field. Each column is identified in these figures by the name of the field that it contains.

The first table 46 associates, with each terminal $T_i$, first through fourth fields: i, $T_i$.State, $T_i$.CM and $T_i$.DAck.

The first field "i" contains the identifier of the terminal $T_i$.

The second field $T_i$.State characterizes the status of the terminal $T_i$ from the standpoint of the head end 6. It takes on three distinct values: "C," "D," or "PC." The value "C" indicates that the head end 6 considers the terminal $T_i$ to be in its ready state. The value "D" indicates that the head end 6 considers the terminal $T_i$ to being its occupied state. The value "PC" indicates that the head end 6 is uncertain about the terminal's state.

The third field $T_i$.CM contains the value of a counter that is incremented by a regular step. In the embodiment described herein, the regular step is equal to unity. In the following, this field $T_i$.CM is also known as the counter $T_i$.CM.

The fourth field $T_i$.DAck contains the last date on which the access-rights server 40 established, with certainty, that the terminal $T_i$ was in its ready state.

The broadcast list 50 is the list of identifiers of all the terminals contained in the first table 46 whose second field $T_i$.State takes on a value falling within the group composed of the value "C" and the value "PC." The broadcast list 50 thus does not include the identifiers of the terminals $T_i$ for which the value of the second field $T_i$.State is equal to "D."

In the particular embodiment shown, the first table 46 likewise includes an optional supplemental field $T_i.K_i$ that contains a private key $K_i$ for the terminal $T_i$. Thus, each terminal of the broadcast system 2 has a private key $K_i$ that is different from that of the other terminals of the same system. In some embodiments, the memory 78 of each terminal pre-records a private key $K_i$. In some embodiments, only the access-rights server 40 and the terminal $T_i$ know the private key $K_i$.

FIG. 3 shows one example of the second table 48.

The second table 48 associates, with each terminal $T_i$ of the broadcast system 2, an occupation profile. For this purpose, the second table 48 contains: one row per terminal $T_i$ of the broadcast system 2, one column "i" containing the identifier of the terminal $T_i$, and one column for each predefined time slot $PH_j$ containing the value of a field $T_i.PH_j$.

The index "j" identifies a predefined time slot among the set of predefined time slots used in the broadcast system 2. The time slots $PH_j$ divide a continuous period of observation into several time slots. Typically, the number of time slots $PH_j$ is strictly greater than two, and preferably greater than four or eight. This number is also generally less than fifty or one-hundred.

In a typical embodiment, the period of observation is equal to twenty-four hours and the duration of each time slot $PH_j$ is equal to one hour. Thus, there are twenty-four slots $PH_j$ denoted respectively $PH_1$ to $PH_{24}$. The start and end times of each time slot $PH_j$ are known. For example, the slot $PH_1$ starts at 00:00 and ends at 01:00 in the morning. The slot $PH_2$ starts an instant after 01:00 in the morning and ends at 02:00 in the morning. Thus, each slot $PH_j$ starts at the (j−1) hour and ends at the j mod 24 hour.

The value of the field $T_i.PH_j$ increases as the probability that the terminal $T_i$ is in the ready state during the time slot $PH_j$ increases. In the illustrated embodiment, the field $T_i.PH_j$ is incremented or alternately decremented by a regular step as described in reference to FIG. 4. Here, this regular step is equal to one.

The operation of the broadcast system 2 shall now be described with the aid of the method of FIG. 4.

When a terminal $T_i$ whose identifier does not already appear in the broadcast list 50 wishes to receive its access rights $DA_i$ to access the protected multimedia content currently being broadcast by the device 14, it proceeds with an enrollment phase 100 in which it enrolls on the broadcast list 50. In doing so, the terminal $T_i$ uses the network 8 to establish a point-to-point connection with the access-rights server 40 (step 102).

Having established the point-to-point connection, the terminal $T_i$ then uses it to send an access-rights request to the access-rights server 40 (step 104).

If and only if the user has acquired rights that authorize him to access this multimedia content, the access-rights server 40 responds by adding the identifier i of this terminal $T_i$ to the broadcast list 50 (step 106). To do this, the access-rights server 40 assigns, in the first table 46, the value "C" to the second field $T_i$.State. In addition, the access-rights server 40 initializes the value of the counter $T_i$.CM to zero and the value of the fourth field $T_i$.DAck to the current date. The access-rights server 40 acquires the current date in a variety of ways. In one embodiment, the access-rights server 40 obtains the current date from its own internal clock. In another embodiment, the access-rights server 40 obtains the current date by polling an external clock via the network 8.

At the end of the enrollment phase 100, the identifier i of the terminal $T_i$ will have been added to the broadcast list 50.

In parallel, the device 14 proceeds permanently to a broadcast phase 110 in which it broadcasts the protected multimedia content.

During the broadcast phase 110, the device 14 broadcasts the scrambled multimedia content multiplexed with the entitlement-control messages $ECM_t$ prepared by the conditional-access system 28 and the entitlement-management messages EMM containing the access rights $DA_i$ prepared by the access-rights server 40 (step 112). It does so simultaneously to all the terminals of the broadcast system 2 via the network 8. For this, typically the device 14 uses a "broadcast" connection between itself and the set of terminals of the broadcast system 2. Thus, all the terminals may receive the scrambled multimedia content and the entitlement-control messages $ECM_t$ and the entitlement-management messages EMM as of the moment that they are in their ready state.

In parallel, whenever the operating key $K_s$ is modified, the access-rights server 40 prepares new access rights $DA_i$ solely for all the terminals whose identifier appears in the broadcast list 50 (step 114). In doing so, the access-rights server 40 encrypts, for each terminal whose identifier appears in the broadcast list 50, the operating key $K_s$ with the private key $K_i$ of that terminal $T_i$ in order to construct the cryptogram $K_s^*(K_i)$. This private key $K_i$ is obtained from the first table 46.

Typically, the encryption algorithm of the operating key $K_s$ implemented by the access-rights server 40 is a symmetrical encryption algorithm. The access right $DA_i$ so prepared is specific to the terminal $T_i$ since it contains the cryptogram $K_s^*(K_i)$, which only this terminal $T_i$ can decrypt properly.

The prepared access rights $DA_i$ are then transmitted to the conditional-access system 28. The conditional-access system 28 periodically broadcasts these access rights $DA_i$. In the embodiment described herein, the conditional-access system 28 transmits the access right $DA_i$ by inserting it into an entitlement-management message EMM message and by periodically broadcasting this entitlement-management message EMM. This access right $DA_i$, even if it is received by terminals other than the terminal $T_i$, cannot be used by those other terminals to access the multimedia content in clear. In this embodiment, only the access rights $DA_i$ permit access to the protected multimedia content.

The period of broadcasting of the access rights $DA_i$ is typically longer than five minutes or thirty minutes and generally less than one month or one week or twenty-four hours or twice the duration of the time slots. In the embodiment described herein, the length of this period is equal to the duration of the time slots $PH_j$, which in this case is equal to one hour.

If the terminal $T_i$ is in its ready state, it receives the scrambled multimedia content, which has been multiplexed with the entitlement-control message $ECM_t$ and the entitlement-management messages EMM (step 116). The demultiplexer 72 then transmits the scrambled multimedia content to the descrambler 74 and the entitlement-control message $ECM_t$ and the entitlement-management messages EMM to the security processor 76. In response to having received the entitlement-management messages EMM, the security processor 76 uses the access right $DA_i$ by decrypting the cryptogram $K_s^*(K_i)$ with the aid of its private key $K_i$ to obtain the operating key $K_s$ in clear. This operating key $K_s$ in clear is then recorded in the memory 78.

Once this has been done, the terminal $T_i$ establishes a point-to-point connection with the head end 6 and uses it to send a receipt acknowledgement to the access-rights server 40 (step 118). The point-to-point connection is then interrupted.

In response, whenever a terminal $T_i$ acknowledges receipt of the access right $DA_i$, the access-rights server 40 suspends the broadcasting of this access right $DA_i$ until this access right $DA_i$ required to access the multimedia content changes. Once a new access right $DA_i$ is prepared for this terminal $T_i$, it is then again automatically broadcast to this terminal without waiting for the terminal $T_i$ to send a new access-right request for this. This makes it possible to avoid continuing to send the same access right $DA_i$ to the same terminal $T_i$ after it has already acknowledged receipt of this access right.

The terminal $T_i$ then accesses the protected multimedia content (step 120). To do so, the security processor 76 uses the operating key $K_s$ recorded in its memory 78 to decrypt the cryptograms $CW_t^*$ contained in the entitlement-control messages $ECM_t$ received in order to extract the control word $CW_t$ in clear.

The control word $CW_t$, which is in clear, is transmitted to the descrambler 74 which uses it to descramble the cryptoperiod $CP_t$ of the scrambled multimedia content. The rest of the operation of the terminal $T_i$ to display in clear the descrambled and decoded cryptoperiod $CP_t$ on the screen 86 has already been described above and thus will not be repeated here.

After step 114, if the terminal $T_i$ is in its occupied state, it does not receive the access right $DA_i$ sent by the access-rights server 40 or it is unable to send the receipt acknowledgement to the access-rights server 40. In this case, it cannot execute at least step 118. Thus, in this case the terminal $T_i$ does not send the receipt acknowledgement to the access-rights server 40.

In parallel with enrollment phase 100 and the broadcast phase 110, the access-rights server 40 likewise proceeds with a management phase 130 in which it manages the state of the terminals and automatically updates the broadcast list 50.

Each time that the access-rights server 40 receives, from a terminal $T_i$, a receipt acknowledgement, it uses this message as a status message telling it that this terminal $T_i$ is in the ready state (step 132). Thus, in response to having received this receipt acknowledgement, the access-rights server 40 automatically assigns the value "C" to the second field $T_i$.State associated with this terminal $T_i$ by the first table 46. It then proceeds to initialize by assigning the current date to the fourth field $T_i$.DAck and assigning the value "0" to the counter $T_i$.CM.

Next, the access-rights server 40 automatically updates the terminal's occupation profile in the second table (step 146) and proceeds to make use of this profile.

The updating step 146 starts with the access-rights server 40 comparing the value of the second field $T_i$.State to the value "C" (operation 148).

If the value of the second field $T_i$.State is equal to "C", the access-rights server 40 increments the value of the field $T_i.PH_j$ by one. The time slot $PH_j$ is the current time slot, namely the one that contains the current time. The access-rights server 40 obtains the current time from its own internal clock or by polling an external clock (operation 150).

If the value of the second field $T_i$.State is equal to the value "PC" or to the value "D" and only if the value of the field $T_i.PH_j$ is strictly greater than zero, then the access-rights server 40 decrements the value of the field $T_i.PH_j$ by unity (operation 152).

In other embodiments, the increment associated with the incrementing step is other than unity. In such cases, the decrement during the decrementing operation is equal to the increment.

The access-rights server 40 likewise associates, with each field $T_i.PH_j$, an indicator $I_{i,j}$ that is set to either "true" or "false." When set to "true," the indicator $I_{i,j}$ indicates that the probability that the terminal $T_i$ is in the ready state during the time slot $PH_j$ is substantial.

After having updated the field $T_i.PH_j$ (operation 154), the access-rights server 40 updates the indicators $I_{i,j}$. In doing so, the access-rights server 40 sets an indicator $I_{i,j}$ to be "true" if the value of the field $T_i.PH_j$ is greater than or equal to a threshold $S_{PH}$ and if the value of the field $T_i.PH_{j-1}$ is greater than the threshold $S_{PH}$ or if the value of the field $T_i.PH_{j+1}$ is greater than the threshold $S_{PH}$.

The value of the threshold $S_{PH}$ is predetermined. In typical embodiments, it is greater than or equal to two or four but generally less than fifty. In the embodiment described herein, the value of the threshold $S_{PH}$ is equal to two.

The probability of the terminal $T_i$ being in the ready state is considered to be substantial if the probability of the terminal $T_i$ being in the ready state during the slot $PH_j$ is substantial and if this slot $PH_j$ is contiguous with at least one other slot $PH_{j-1}$, $PH_{j+1}$ during which it is also highly probable that the terminal $T_i$ is in its ready state.

Next, if the value of the second field $T_i$.State is equal to "PC" or "D" and if the current time slot $PH_j$ is associated with an indicator $I_{i,j}$ whose value is "true", the access-rights server 40 assigns the value "PC" to the second field $T_i$.State (step 156). Otherwise, it leaves the value of the second field $T_i$.State unchanged (step 156).

Thus, each time that the access-rights server 40 receives a receipt acknowledgement from a terminal $T_i$, the value of the second field $T_i$.State associated with this terminal $T_i$ is systematically switched to the value "C".

In parallel, each time that the access-rights server 40 sends an access right $DA_i$ to a terminal $T_i$ (step 114), it checks whether the value of the second field $T_i$.State is equal to the value "C" (step 134). If so, it immediately switches the second field $T_i$.State from the value "C" to the value "PC" (step 136). It does so without waiting for the receipt acknowledgement that is to be transmitted to it, in response, by the terminal $T_i$ (step 118). The method then returns to step 134.

Thus, if the terminal $T_i$ is in its ready state, the value of the second field $T_i$.State is reset to the value "C" once the access-rights server 40 receives the receipt acknowledgement sent by the terminal during step 132. Otherwise, if the terminal $T_i$ does not send any receipt acknowledgement in response to the sending of the access right $DA_i$, the value of the second field $T_i$.State remains equal to "PC" until the next time that an access right $DA_i$ is sent for this terminal.

In the case in which the value of the second field $T_i$.State differs from the value "C", the access-rights server 40 compares the value of the second field $T_i$.State to the value "PC" (step 138).

If the value of the second field $T_i$.State is equal to the value "PC", the access-rights server 40 then proceeds with a step 140.

The access-rights server 40 then compares the value of the counter $T_i$.CM to a predetermined threshold M (step 140). Typically, M is a whole number greater than or equal to two, and generally less than or equal to ten or twenty. In the embodiment described herein, M is equal to three.

If the value of the counter $T_i$.CM is greater than or equal to M, then the access-rights server 40 assigns the value "D" to the second field $T_i$.State in the first table 46 (step 142). This automatically excludes this terminal T from the broadcast list 50. Thus, from this moment onward, the device 14 no longer broadcasts access rights $DA_i$ to this terminal $T_i$. This limits the quantity of information transmitted on the network 8, therefore economizing on bandwidth.

If the access-rights server 40 determines that the value of the field $T_i$.CM is less than the threshold M (step 140), it increments the value of the field $T_i$.CM by unity and records the incremented value in the first table 46 (step 144). Otherwise, it does not assign the value "D" to the second field $T_i$.State.

At the end of step 142 or 144, the access-rights server 40 updates the occupation profile of the terminal $T_i$ to make use of this profile (step 166). Step 166 is identical to step 146.

At the end of the execution of step 166, the value of the second field $T_i$.State is equal to "PC" even if the value "D" was assigned to it during step 142 provided that its occupation profile indicates that it is highly probable that this terminal $T_i$ will switch to its ready state during the current time slot $PH_j$.

After step 166, the access-rights server 40 calculates the difference between the current date and the date contained in the fourth field $T_i$.DAck (step 168). If this difference is greater than a threshold $T_{off}$, the access-rights server 40 assigns the value "D" to the second field $T_i$.State. Otherwise, the value of the second field $T_i$.State remains unchanged.

The threshold $T_{off}$ is a predetermined threshold greater than or equal to the duration of M time slots $PH_j$ where M is the same threshold as the one previously defined for the counter $T_i$.CM. For example, the threshold $T_{off}$ is greater than the duration of at least ten time slots $PH_j$. In the embodiment described herein, the threshold $T_{off}$ is forty-eight hours.

After step 168, the method returns to step 134.

At the end of steps 140 to 168, the value of the second field $T_i$.State is equal to the value "PC" even if the terminal $T_i$ has not sent a receipt acknowledgement to the access-rights server 40 provided that the current time slot $PH_j$ is marked as being a time slot during which it is very probable that the terminal $T_i$ will switch to its ready state and provided that the time since the last time that a receipt acknowledgement was sent is no longer than the value of the threshold $T_{off}$.

Keeping the value of the second field $T_i$.State equal to the value "PC" under these conditions makes it possible to keep the terminal $T_i$ on the broadcast list 50 even if the access-rights server 40 does not know with certainty whether this terminal $T_i$ is in its ready state. Therefore, if the terminal $T_i$ switches from its occupied state to its ready state in the middle of the time slot $PH_j$ associated with the "true" value of the indicator $I_{i,j}$, it does not have to execute the enrollment phase 100. The identifier of the terminal $T_i$ would already be on the broadcast list 50. This limits the number of access-right requests to be processed by the access-rights server 40 and improves the quality of service.

Conversely, at the end of steps 140 to 168, if the terminal $T_i$ has not sent a receipt acknowledgement in response to the last M transmissions of access right $DA_i$ and if the current time slot $PH_j$ is a time slot during which the probability of the terminal $T_i$ being in the ready state is not substantial, then the identifier of the terminal $T_i$ is automatically removed from the broadcast list 50.

The access-rights server 40 thus automatically removes the identifier of a terminal $T_i$ from the broadcast list 50 when that terminal $T_i$ fails to indicate that it is in the ready state during those time slots in which the probability of this terminal switching to its ready state is not substantial, i.e., does not meet some predetermined threshold. The access-rights server 40 likewise systematically removes the identifier of a terminal $T_i$ from the broadcast list 50 if that terminal has not sent a receipt acknowledgement during a period greater than the value of the threshold $T_{off}$.

If, during step 138, the access-rights server 40 determines that the value of the second field $T_i$.State is equal to the value "D", it proceeds with updating and making use of the occupation profile of the terminal $T_i$ (step 170) in the same way already discussed in connection with step 146.

Step 170 is systematically followed by a step 172, identical to step 168.

Thus, if the value of the second field $T_i$.State is equal to the value "D", the latter automatically becomes equal once more to the value "PC" at the end of steps 170 and 172 only if the current time slot $PH_j$ is a time slot during which the probability of the terminal $T_i$ switching to its ready state is substantial and if the terminal $T_i$ has sent at least one receipt acknowledgement to the access-rights server 40 after the limit "Current date–$T_{off}$".

Figure 5:
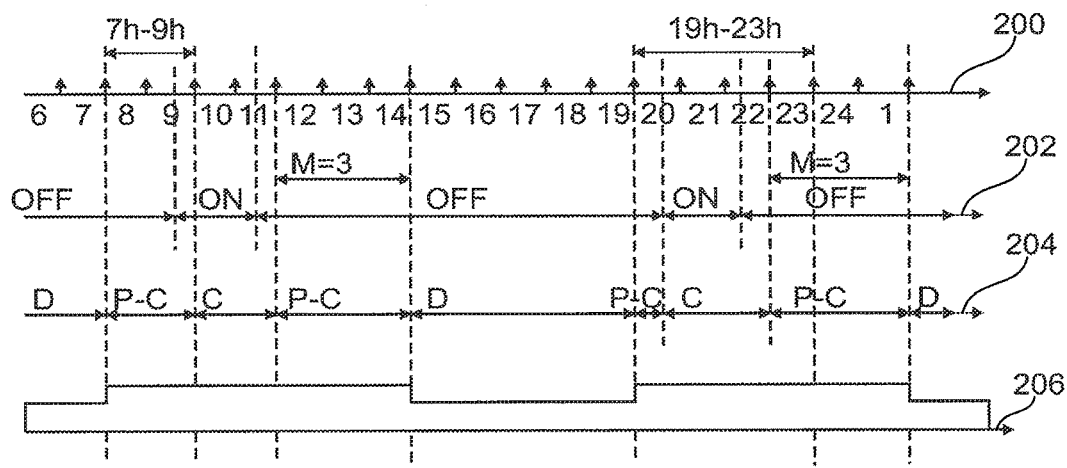
FIG. 5 is a chronogram showing operation of a server and a terminal during operation of the method shown in FIG. 4.
Figure 4:
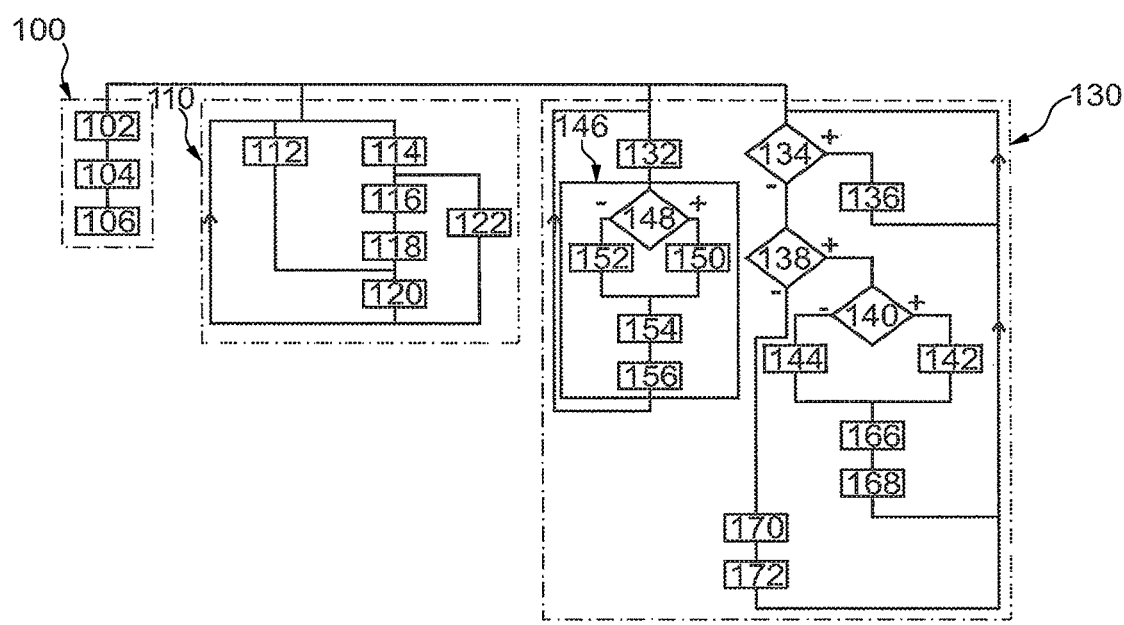
FIG. 4 is a flow chart of a method for broadcasting multimedia content with the help of the system of FIG. 1.

FIG. 5 shows a chronogram illustrating the operation of the access-rights server 40 and a terminal $T_i$ when the method of FIG. 4 is executed. This chronogram contains first, second, third, and fourth horizontal axes 200, 202, 204, 206.

The first horizontal axis 200 is graduated in hours. On this axis, each vertical arrow represents the start of an hour and thus the start of a time slot $PH_j$.

The second horizontal axis 202 represents the periods of time during which the terminal $T_i$ is actually in the ready state or alternately in the occupied state. On this axis, a double horizontal arrow under the symbol "OFF" represents every period of time during which the terminal $T_i$ is in the occupied state. In a similar manner, a double horizontal arrow under the symbol "ON" represents every period of time during which the terminal $T_i$ is in the ready state. The start and end of these double arrows correspond to the times when the terminal $T_i$ switches between these two states.

The third horizontal axis 204 represents the periods of time during which the value of the second field $T_i$.State is equal to the value "C", "PC," or "D".

In the second horizontal axis 202, a double horizontal arrow represents a period of time. A double arrow under the symbol "D" indicates a period of time during which the value of the second field $T_i$.State is equal to the value "D." Double-headed arrows under the symbols "PC" and "C" indicate a period of time during which the values of the second field $T_i$.State are equal to the values "PC" and "C" respectively.

The fourth horizontal axis 206 is a bar graph showing the variation over the course of time in the bandwidth used by the access-rights server 40 to send the access rights $DA_i$ to the terminals. In this bar graph, a taller the bar indicates greater consumption of bandwidth than a shorter bar.

The variation in the bandwidth is shown in the particular case when only the time slots $PH_7$, $PH_8$, $PH_{19}$, $PH_{20}$, $PH_{21}$ and $PH_{22}$ are associated with an indicator $I_{i,j}$ whose value is equal to "true," when the value of the fourth field $T_i$.DAck is initially equal to the current date corresponding to the start of the slot $PH_1$, and when the value of the counter $T_i$.CM is initially equal to zero.

It will likewise be assumed that the access rights $DA_i$ are sent to the terminal $T_i$ once per time slot $PH_j$. Some practices feature sending them at the start of the time slot $PH_j$.

At 07:00, the value of the second field $T_i$.State switches automatically from the value "D" to the value "PC" whereas the terminal $T_i$ is not yet actually in the ready state. This is because it is the start of the time slot $PH_7$. Afterwards, around 08:30, the terminal $T_i$ switches from its occupied state to its ready state. However, at this time, there is no need to send the access-right request to the access-rights server 40 to receive the access rights $DA_i$. This is because the access rights $DA_i$ were would already have been broadcast at 07:00 in the morning.

The terminal $T_i$ changes to its occupied state around 10:30. But the access-rights server 40 first detects this at 11:00. From this moment on, the identifier of the terminal $T_i$ is maintained on the broadcast list 50 for three successive time slots $PH_{11}$, $PH_{12}$ and $PH_{13}$ before being removed around 14:00. From that time on, starting from 14:00, the access rights $DA_i$ are no longer prepared or sent to the terminal $T_i$. This decreases the bandwidth needed to transmit these access rights $DA_i$ to the group of terminals.

Many other embodiments are possible.

In some embodiments, the network that is used to broadcast the protected multimedia content is a network other than the network 8. Examples include a satellite transmission network or a land-based digital television (TNT) network.

In other embodiments, broadcasting of the multimedia content and the access rights $DA_i$ may be done in multicast rather than in broadcast.

Other practices feature transmitting the multimedia content on a first network and transmitting the access rights $DA_i$ on a second network that differs from the first network. In this case, it is not necessary for the two networks to allow establishing a point-to-point connection.

The method of FIG. 4 has been described in the particular case in which a conditional-access system 28 protects the multimedia content. However, what has been described above in this particular case likewise applies to the broadcasting of protected multimedia content by means other than the conditional-access system 28.

For example, in some embodiments, a digital-rights management system replaces the conditional-access system 28. A digital-rights management system is in fact a system for the protection of multimedia content. The digital-rights management system encrypts the multimedia content using an encryption key, and a symmetrical algorithm. The access right that enables accessing of the multimedia content thus encrypted is typically transmitted in a message known as a "license."

Having a well-known structure, such a license contains at least one key, known as a content key, needed for the decryption of the protected multimedia content by the symmetrical encryption algorithm. The content key is generally inserted into the license in the form of a cryptogram obtained by encrypting the content key with an encryption key, or "terminal key," belonging to the terminal or known to it. In order to access the content, the terminal extracts the content key from the license by decrypting its cryptogram with the aid of its terminal key. The terminal's descrambler then descrambles, i.e. decrypts, the content with the aid of the content key so extracted from the license, thereby removing the protection. For example, the digital-rights management system is such as is described in the patent application filed as number FR1451666 on 2 Mar. 2014. By analogy, in this latter case, the specific content key, the content key and the terminal key correspond respectively to the control word $CW_t$ and to the operating key $K_s$ and the private key $K_i$ of the conditional-access system described herein.

An access right can be made specific to a terminal without using a private key $K_i$. For example, the entitlement-management message EMM contains an identifier of the terminal for which it is intended. During the reception of the entitlement-management message EMM by the terminals, they compare their identifiers to the one contained in the entitlement-management message EMM received. If there is no match between these identifiers, the terminal does not process the entitlement-management message EMM. Only the terminal whose identifier corresponds to the identifier contained in the received entitlement-management message EMM will process this message. In this case, the operating key $K_s$ contained in the entitlement-management message EMM is encrypted for example with a key $K_G$ and not with the private key $K_i$ of the terminal $T_i$. The key $K_G$ is for example a key common to a restricted group of several terminals of the broadcast system 2.

In other embodiments, the private key $K_i$ is common to a restricted group of terminals of the broadcast system 2.

In one preferred embodiment, it is the conditional-access system 28 that manages and uses the private keys $K_i$. In this embodiment, the conditional-access system 28 receives from the access-rights server 40, identifiers of the terminals belonging to the broadcast list 50 and for which it is necessary to construct and broadcast access rights $DA_i$. Then, for each of the identifiers of terminals received and only for these identifiers, the conditional-access system 28 constructs the access right $DA_i$ and, in particular, the cryptogram $K_s*K_i$, then incorporates it into an entitlement-management message EMM broadcast to the terminal $T_i$. In this embodiment, the access-rights server 40 only manages the supplemental rights of the terminals and the broadcast list 50, but does not itself construct the cryptograms $K_s*K_i$ contained in the access rights $DA_i$. In fact, it transmits for example the supplemental rights of the terminals to the conditional-access system 28, which constructs the cryptograms $K_s*K_i$ and the access rights $DA_i$.

The use of the counter $T_i.CM$ can be omitted. In this case, the second field $T_i.State$ switches from the value "PC" to the value "D" as of the first absence of receiving a receipt acknowledgement.

In another embodiment, only two values are used for the second field $T_i.State$, namely the values "C" and "D". In this case, all the operations of the method of FIG. 4 using the value "PC" are omitted.

Other embodiments of the occupation profile are possible. For example, the period of observation divided up into time slots may extend for more than one day. For example, this period of observation may be equal to a week or a month. The duration of the time slots may be modified. For example, they may be shorter than an hour or, on the contrary, longer. Typically, the duration of a time slot is between one minute and 24 hours, and preferably between 5 minutes and 3 hours or between 30 minutes and 3 hours. The different time slots may also have different durations from each other. For example, the time slots are shorter at times of a large audience and longer at times of a smaller audience, for example at night.

The occupation profiles may also be constructed and managed differently. For example, in some embodiments, the user himself indicates those time slots during which he customarily uses his terminal. These time slots are then recorded by the access-rights server 40 in the second table 48. Afterwards, these time slots are never updated automatically. This simplifies the method shown in FIG. 4 by omitting the various steps associated with automatically updating the occupation profile.

Other methods of automatically constructing the occupation profile of the terminals are likewise possible. For example, there exist other embodiments that automatically construct the occupation profile of the terminal by taking account of the times during which the terminal T switches between its ready and occupied states and also on the basis of the times during which the other terminals are switching in parallel between their ready and occupied states.

In another embodiment, each field $T_i.PH_j$ contains the probability that the terminal $T_i$ is in the ready state during the time slot $PH_j$. In such embodiments, at every start of a time slot $PH_j$, the access-rights server 40 increments a counter $TPH_j$. The counter $TPH_j$ thus contains the number of times that the time slot $PH_j$ has been encountered. In parallel with this, the access-rights server 40 increments a counter $T_i.PPH_j$ each time that the terminal $T_i$ is in its ready state during the time slot $PH_j$. The value of the field $T_i.PH_j$ is then obtained by dividing the value of the counter $T_i.PPH_j$ by the value of the counter $TPH_j$. In this embodiment, the threshold $S_{PH}$ is typically greater than or equal to 50% of the probability that the terminal $T_i$ is in the ready state. Preferably, the counters $TPH_j$ and $T_i.PPH_j$ are updated by considering only the data contained in a sliding window.

Other embodiments omit the construction and the management of the occupation profiles for each terminal. In this case, all the operations of the method of FIG. 4 that use an occupation profile are omitted.

The number of contiguous time slots to be taken into account in order to change the indicator $I_{i,j}$ to the "true" value may be greater than or equal to two or on the contrary equal to one. In the latter case, the indicator $I_{i,j}$ takes on the "true" value once the value of the field $T_i.PH_j$ is greater than the threshold $S_{PH}$.

In alternative practices, the access-rights server 40 learns the status of a terminal $T_i$ by sending it a status request. The terminal $T_i$ then responds by sending, to the access-rights server 40, by means of a point-to-point connection, a status message indicating that it is in its ready state. If the terminal $T_i$ is not in its ready state, it is unable to send this status message in response to the status request.

In these practices, the status request is typically a message different from the message containing the access rights $DA_i$ transmitted to this terminal. The status request is transmitted by means of a point-to-point connection or point-to-multipoint connection, either at predetermined times or at times that are determined as a function of the occupation profile.

In the embodiments described above, the event in response to which the terminal sends a status message is a message transmitted from the head end 6 to the terminal. However, this event may also be the occurrence of a predetermined time. For example, in another variant, as long as the terminal $T_i$ is in its ready state it sends at regular intervals, by means of a point-to-point connection, a status message to the access-rights server 40. In this embodiment, the status message is thus not transmitted in response to a request or to a message sent by the access-rights server 40.

The access-rights server 40 thus processes these status messages as described above. In particular, the counter $T_i.CM$ is incremented by one each time no status message has been received at the predetermined time when such a status message should have been received if the terminal $T_i$ was in its ready state.

Some alternative practices omit steps 168 and 172.

Each time a receipt acknowledgement is received from the terminal $T_i$, the current date is recorded in the fourth field $T_i.DAck$. Afterwards, the date contained in the fourth field $T_i.DAck$ may be used as the current date to identify the current time slot during the execution of step 146.

In some practices, each time that a terminal $T_i$ acknowledges reception of the access right $DA_i$, the broadcasting of this access right $DA_i$ is not halted until such time as this access right $DA_i$ required to access the multimedia content changes. Thenceforth, the same access right $DA_i$ is broadcast periodically to the terminal $T_i$ as long as the identifier of this terminal appears on the broadcast list 50.

The method described here may be combined with the method described in application WO2009094502A1. In this case, during each time slot when the access rights $DA_i$ are prepared and broadcast solely to a restricted group of terminals, the access-rights server 40 automatically removes from this restricted group the terminals that are in the occupied state and that thus do not send any status messages.

The invention claimed is:

1. A method comprising broadcasting protected multimedia content, which is protected by access rights, to terminals that are mechanically independent of each other and that are connected to the same access-rights server by way of a long-distance information transmission network, wherein broadcasting comprises having a terminal send, to the access-rights server, an access-rights request, said access-rights request being a request to receive access rights authorizing the terminal to access the multimedia content, in response to receiving the access-rights request, having the access-rights server add an identifier of the terminal to a broadcast list, having the access-rights server broadcast, at predetermined intervals, each new access right to the multimedia content only to those terminals whose identifier appears in the broadcast list and without waiting for those terminals to have requested the new access-right by sending a new access-rights request, in response to receiving each access right, having the terminal access the multimedia-content broadcast and, in the absence of having received the access right, having the terminal prevent access to the multimedia-content broadcast, at any given time, having the terminal switch independently of the other terminals from a ready state to an occupied state, wherein, in the ready state, the terminal is able to send, via a point-to-point connection, the access-rights request and to receive the requested access right, and wherein, in the occupied state, the terminal is unable to either send, via the point-to-point connection, the access-rights request or to receive the access right, in response to a predetermined event, having the terminal execute an action selected from the group consisting of a first action and a second action, wherein said first action is selected when said terminal is in said occupied state, and wherein said second action is selected otherwise, wherein said first action comprises sending, to the access-rights server, via a point-to-point connection, a status message telling the access-rights server that it is in its ready state, and wherein said second action comprises avoiding the sending of said status message and in the absence of receiving the expected status message in response to the predetermined event, having the access-rights server automatically remove the identifier of the terminal from the broadcast list.

2. The method claim 1, further comprising memorizing, for each terminal, an occupation profile that contains time slots and, for each time, slot, indicator of the probability of the terminal being in a ready-state thereof during said time slot, for each terminal and each time slot on the terminal, determining that a condition has been met, and, if and only if said condition has been met, at the start of said time slot, having the access-rights identifier automatically add the identifier of the terminal to the broadcast list without waiting for the terminal to have sent an access-rights request, wherein said condition that is to be met is the condition that the occupation profile of the time slot of the terminal include an indicator that indicates that said terminal is in a ready-state thereof for longer than a predetermined threshold.

3. The method of claim 2, wherein, in response to having received each status message at the predetermined time, having the access-rights server increment the value of the indicator associated with the time slot during which the status message was received or, in the absence of having received said status message at the predetermined time, having the access-rights server decrement the value of said indicator.

4. The method as claimed in claim 1, wherein, in the absence of having received a status message from a terminal, having the access-rights server increment a counter associated specifically with said terminal, and automatically removing the identifier of said terminal from the broadcast list only when said counter has crossed a predetermined threshold or, in the event of having received a status message from the terminal, having the access-rights server reinitialize the counter.

5. The method of to claim 1, further comprising having the access-rights server prepare, for each terminal whose identifier appears in the broadcast list and only for those terminals, a specific access right that only said terminal may use to remove the protection from the protected multimedia-content and to thus access said multimedia content in the clear, the other terminals being unable to use said specific access right to access the multimedia content in the clear, and, in response to receiving each specific access right prepared for said terminal, having the terminal access the multimedia-content broadcast and, in the absence of receiving the specific access right, having the terminal prevent access to the multimedia content broadcast.

6. The method of claim 5, wherein, as long as the terminal is in a ready state thereof, and only in response to having received each specific access-right prepared for said terminal, having the terminal send, via a point-to-point connection, a receipt acknowledgement to the access-rights server to confirm the receipt of said specific access-right, and having the access-rights server use said receipt acknowledgement as a status message indicating that the terminal is in said ready state.

7. The method of claim 6, further comprising having the access-rights server periodically broadcast the same access right for as long as no receipt acknowledgement of said access right has been received and, in response to receiving the receipt acknowledgement of said access right, having the access-rights server interrupt the broadcasting of said access right.

8. The method of claim 1, further comprising, in response to said access-rights server receiving a status message from a terminal, having said access-rights server record the date on which said status message was received, and, in parallel, having said access-rights server compare, at regular intervals, a predetermined threshold to the difference between a current date and the last recorded date on which a status message was received for said terminal, and only if said predetermined threshold has been crossed, having the access-rights server automatically and systematically remove the identifier of said terminal from the broadcast list.

9. The method of claim 1, wherein broadcasting protected multimedia content comprises broadcasting said protected multimedia content in a non-abstract manner.

10. A manufacture comprising a non-transitory information recording medium comprising instructions to carry out method for broadcasting protected multimedia content as recited in claim 1 when said instructions are executed by an electronic computer.

11. An apparatus comprising an access-rights server that has been specifically designed to carry out the method of claim 1, wherein the access right server comprises an electronic computer programmed to receive an access-rights request sent by a terminal wishing to receive access rights authorizing said terminal access the multimedia content, in response to the access-rights request received, add an identifier of the terminal to a broadcast list, broadcast, at predetermined intervals, each new access right to the multimedia content broadcast only to those terminals whose identifier appears in the broadcast list and without waiting for said terminals to have requested said new access right by sending a new access-rights request, in response to a predetermined event, receive from the terminal, via a point-to-point connection, a status message telling the access-rights server that said terminal is in a ready state thereof or, in the alternative, to recognize an absence of said status message when said terminal is in an occupied state thereof, and in response to the absence of receiving the expected status message in response to the predetermined event, automatically remove the identifier of this terminal from the broadcast list.

12. The apparatus of claim 11, wherein said an access-rights server is a non-abstract access-rights server, and wherein said access-rights server comprises matter.

* * * * *